United States Patent
Belhe et al.

(10) Patent No.: US 12,106,044 B2
(45) Date of Patent: Oct. 1, 2024

(54) METHOD AND SYSTEM FOR DETERMINING QUALITY OF A DOCUMENT DURING RISK AND COMPLIANCE ASSESSMENT

(71) Applicant: Wipro Limited, Bangalore (IN)

(72) Inventors: Swapnil Dnyaneshwar Belhe, Pune (IN); Zaheer Juzer Javi, Pune (IN); Pravin Pawar, Pune (IN)

(73) Assignee: Wipro Limited, Bangalore (IN)

( * ) Notice: Subject to any disclaimer, the term of this patent is extended or adjusted under 35 U.S.C. 154(b) by 314 days.

(21) Appl. No.: 17/804,901

(22) Filed: Jun. 1, 2022

(65) Prior Publication Data
US 2023/0315981 A1    Oct. 5, 2023

(30) Foreign Application Priority Data
Mar. 31, 2022   (IN) .............................. 202241019734

(51) Int. Cl.
  *G06F 40/20*  (2020.01)
  *G06F 40/103*  (2020.01)
  *G06F 40/166*  (2020.01)

(52) U.S. Cl.
  CPC ............ *G06F 40/20* (2020.01); *G06F 40/103* (2020.01); *G06F 40/166* (2020.01)

(58) Field of Classification Search
  CPC ........ G06F 40/20; G06F 40/30; G06F 40/103; G06F 40/191; G06F 40/166; G06Q 50/18
  See application file for complete search history.

(56) References Cited

U.S. PATENT DOCUMENTS

| | | |
|---|---|---|
| 9,959,273 B2 | 5/2018 | Bergman et al. |
| 10,713,431 B2 | 7/2020 | Ghatage et al. |
| 2014/0210824 A1* | 7/2014 | Hadley ................... G06F 16/93 345/427 |
| 2015/0046369 A1 | 2/2015 | Taylor et al. |
| 2020/0125827 A1* | 4/2020 | Freed ....................... G06F 16/93 |
| 2020/0160050 A1* | 5/2020 | Bhotika ............... G06V 30/414 |
| 2023/0195847 A1* | 6/2023 | Koukoumidis ....... G06F 18/285 704/9 |

* cited by examiner

*Primary Examiner* — Huyen X Vo
(74) *Attorney, Agent, or Firm* — Finnegan, Henderson, Farabow, Garrett & Dunner, LLP (57) ABSTRACT

Disclosed herein is a method and system for determining quality of an input document during risk and compliance assessment. The method includes receiving input document for risk and compliance assessment, identifying a document type, and at least one sub-type of the input document using a Natural Language Processing (NLP) technique and a trained neural network model. Layout of content present in the input document is detected based on each of a plurality of segments extracted from content and structural parameters associated with respective segments. A document review model is identified from a plurality of document review models based on type and at least one sub-type of input document. Thereafter, the quality of the input document and a compliance score is determined by identifying one or more deviations of content of the input document from content of a predefined template for the input document.

20 Claims, 6 Drawing Sheets

CONTRACT AGREEMENT

THIS AGREEMENTS IS MADE ON ______________

BY AND BETWEEN

1] [THE FIRST PARTY ABC]   CALLED AS PARTY 1

2] [THE SECOND PARTY XYZ] CALLED AS PARY 2

TERM

THIS AGREEMENT SHALL EXTEND FROM THE EFFECTIVE DATE FOR A PERIOD OF THREE (3) YEARS THEREAFTER. THE DURATION OF THIS AGREEMENT MAY BE SHORTENED BY EITHER PARTY BY DELIVERY OF WRITTEN NOTICE OF EARLY TERMINATION TO THE OTHER PARTY. SUCH EARLY TERMINATION SHALL BE EFFECTIVE THIRTY (30) DAYS AFTER DELIVERY OF THE WRITTEN NOTICE

GOVERNING LAW

THIS AGREEMENT SHALL BE GOVERNED BY, AND CONSTRUED IN ACCORDANCE WITH, THE LAW OF THE STATE OF ~~NEW YORK~~ CALIFORNIA.

INDEMNIFICATION

INDEMNIFICATION. NOTWITHSTANDING ANY CONTRARY PROVISION CONTAINED IN THIS AGREEMENT, ANY ELECTION HEREUNDER OR ANY TERMINATION OF THIS AGREEMENT, AND WHETHER OR NOT THIS AGREEMENT IS OTHERWISE CARRIED OUT, THE PROVISIONS OF SECTION 5 SHALL NOT BE IN ANY WAY AFFECTED BY SUCH ELECTION OR TERMINATION OR FAILURE TO CARRY OUT THE TERMS OF THIS AGREEMENT OR ANY PART HEREOF.

~~WARRENTY~~

~~ABC INC. MAKES NO WARRANTY OF ANY KIND, INCLUDING NO WARRANTY OR REPRESENTATION AS TO THE ACCURACY OR COMPLETENESS OF THE INFORMATION DISCLOSED PURSUANT TO THIS AGREEMENT. NEITHER UTC, NOR ITS OFFICERS, DIRECTORS, EMPLOYEES OR AGENTS, SHALL HAVE ANY LIABILITY INCLUDING FOR INCIDENTAL, SPECIAL OR CONSEQUENTIAL DAMAGES TO COMPANY OR ITS OFFICERS, DIRECTORS, AGENTS OR EMPLOYEES RESULTING FROM COMPANY'S POSSESSION OR USE OF SUCH INFORMATION~~

METHOD AND SYSTEM FOR DETERMINING QUALITY OF A DOCUMENT DURING RISK AND COMPLIANCE ASSESSMENT

TECHNICAL FIELD

The present subject matter is generally related to content analysis systems and more particularly, but not exclusively, to a method and system for determining quality of a document during compliance assessment.

BACKGROUND

Document scrutiny is a crucial aspect when entities engage with each other via legal documentations. There may be an exchange of a number of documents which includes legal contracts, standard operating procedures, manuals, forms, email communications, and the like. During this process, it is required to consider all aspects such as, legal, financial, human resource, and the like, as it may define their role in this engagement. Also, it is required to calculate multiple compliances and identify any risk in such documents and communications. Calculating risk and compliance of documents which adhere to internal and regulatory compliances, require meticulous reading of the documents. During scrutiny, either entity/party must look for all things and risk associated with such documents. For instance, some of the entities can be of high importance and some can be risky if those are not included in an agreement. The risk associated with a document is not only limited to mere presence of an entity but also with the way the entity is mentioned. Therefore, all these documents may go through multiple human reviews, internal as well as counter party. This involves lots of manual efforts and time. Such manual efforts and time complexity may lead to high risks such as, leakage of information, missed clauses, wrong language, and the like.

For instance, for an analyst, reviewing a document requires manually gathering and going through every possible and crucial information present in the document. It takes tremendous manual efforts and time to complete a review process. Also, there may be different sets of such crucial information for different documents. This set will not only be different but will also have different level of risks associated with it. Hence, it is required that the analyst must know the risks, importance, and expertise for every type of the document.

Existing systems do not identify appropriate document template for compliance monitoring based on context of the input document. These systems also fail to monitor and identify risks associated with the document if the input document does not follow any standardized provisions.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure discloses a method of determining quality of a document during risk and compliance assessment. The method comprises receiving an input document from a user for risk and compliance assessment, identifying a type, and at least one sub-type of the input document using a Natural Language Processing (NLP) technique and a trained neural network model. The method comprises detecting layout of content present in the input document based on each of a plurality of segments extracted from the content and structural parameters associated with respective segments using a trained layout detection model. A document review model is identified from a plurality of document review models based on the type and the at least one sub-type of the input document. Each of the plurality of document review models are trained for the type of input document. Thereafter, the method comprises determining the quality of the input document and a compliance score by identifying one or more deviations of the content of the input document from content of a predefined template for the input document based on the document review model.

Further, in an embodiment, the present disclosure discloses a quality determination system for determining quality a document during risk and compliance assessment. The quality determination system comprises a processor, and a memory communicatively coupled to the processor. The processor receives an input document from a user for risk and compliance assessment, and identifies a type, and at least one sub-type of the input document using a Natural Language Processing (NLP) technique and a trained neural network model. The processor detects layout of content present in the input document based on each of a plurality of segments extracted from the content and structural parameters associated with respective segments using a trained layout detection model. Further, a document review model is identified from a plurality of document review models based on the type and the at least one sub-type of the input document. Each of the plurality of document review models are trained for the type of input document. Thereafter, the processor determines the quality of the input document and a compliance score by identifying one or more deviations of the content of the input document from content of a predefined template for the input document based on the document review model.

In an embodiment, the present disclosure relates to a non-transitory computer readable medium including instructions stored thereon that when processed by at least one processor may cause a quality determination system to receive an input document from a user for risk and compliance assessment. The instruction causes the processor to identify a type, and at least one sub-type of the input document using a Natural Language Processing (NLP) technique and a trained neural network model. The instruction causes the processor to detect layout of content present in the input document based on each of a plurality of segments extracted from the content and structural parameters associated with respective segments using a trained layout detection model. A document review model is identified from a plurality of document review models based on the type and the at least one sub-type of the input document. Each of the plurality of document review models are trained for the type of input document. Thereafter, the instruction causes the processor to determine the quality of the input document and a compliance score by identifying one or more deviations of the content of the input document from content of a predefined template for the input document based on the document review model.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

It should be appreciated by those skilled in the art that any flow diagrams and timing diagrams herein represent conceptual views of illustrative device embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises," "comprising," "includes," "including" or any other variations thereof, are intended to cover a non-exclusive inclusion, such that a setup, device, or method that comprises a list of components or steps does not include only those components or steps but may include other components or steps not expressly listed or inherent to such setup, device, or method. In other words, one or more elements in a system or apparatus proceeded by "comprises . . . a" does not, without more constraints, preclude the existence of other elements or additional elements in the system or method.

Embodiments of the present disclosure may relate to a quality determination system and a method for determining quality of a document during risk and compliance assessment. The present disclosure determines the quality for any type of document including unstructured document by implementing Natural Language Processing (NLP) and Artificial Intelligence (AI) technique. The NLP and AI technique is used to leverage information in the document and extract a plurality of segments from content of the document. Particularly, the present disclosure may determine layout of the content of the document based on the plurality of segments by parsing entire document at modular level. For instance, parsing words in a sentence to analyze sentence structure as well as morphology of content in the document. A document review model is used to determine the quality associated with the document based on deviation analysis. Further, the present disclosure provides feedback learning in order to retrain the review model based on Subject Matter Expert (SME) feedback. The present disclosure may also plug external models trained on similar data. Therefore, the present disclosure facilitates automated compliance monitoring of documents which provides quick processing for time critical documents. In addition, the present disclosure provides better standardization for documents authoring process.

Figure 1:
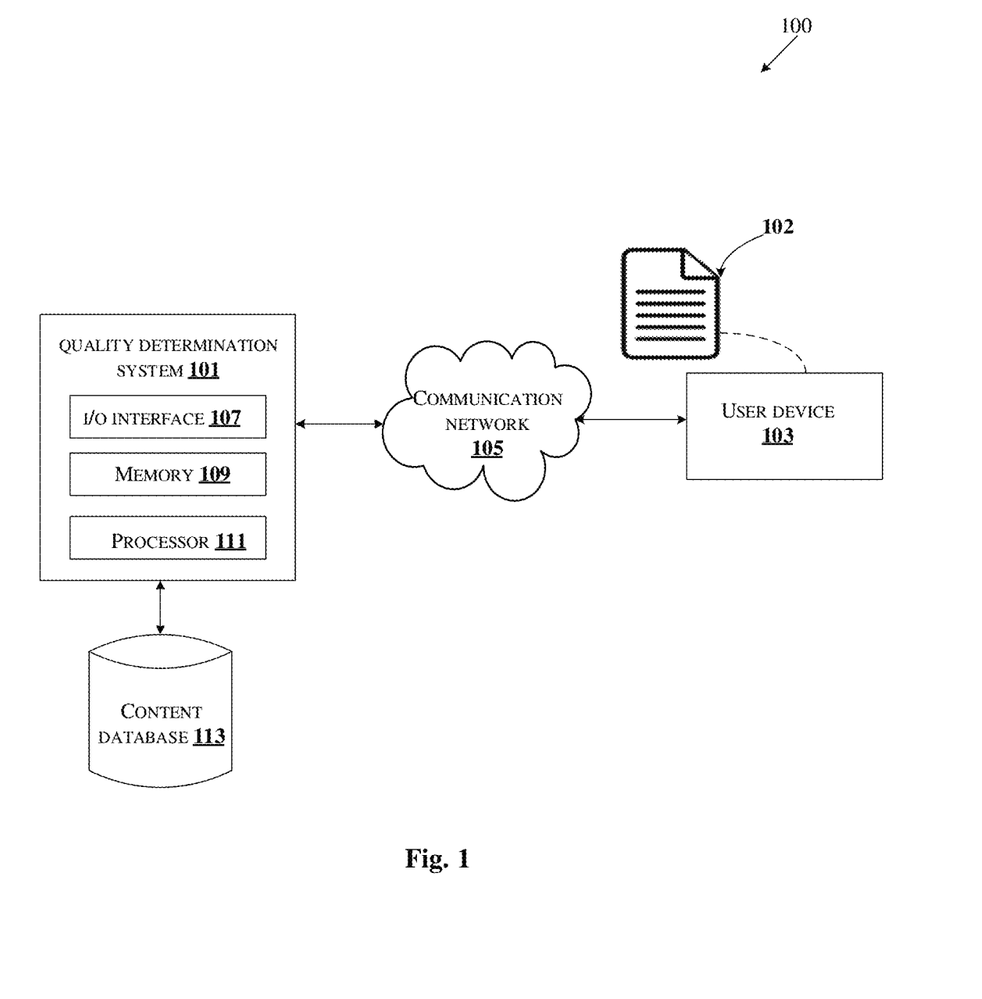
FIG. 1 shows an exemplary environment for determining quality a document during risk and compliance assessment in accordance with some embodiments of the present disclosure.

FIG. 1 shows an exemplary environment for determining quality of a document during risk and compliance assessment in accordance with some embodiments of the present disclosure.

As shown in FIG. 1, the environment 100 may include a quality determination system 101 connected to a user device 103 through a communication network 105 for determining quality an input document 102. In an embodiment, the quality determination system 101 may be connected to the user device 103 through a wired communication interface or a wireless communication interface for determining the quality of the input document 102. In the present disclosure, the user device 103 may be any computing device. For instance, the user device 103 may include, a smart phone, a Personal Computer (PC), a tablet, a notebook, and the like. A person skilled in the art would understand that any other computing device in the environment 100, not mentioned herein explicitly, may also be referred as the user device 103. The quality determination system 101 may be implemented on any computing device such as, a server, a High-Performance Computer (HPC), an electronic device, and the like. In an embodiment, the quality determination system 101 may be implemented on the user device 103 for determining the quality associated with the input document 102. In some implementations, the quality determination system 101 may include an I/O interface 107, a memory 109 and a processor 111 as explained in detail in subsequent figures of the detailed description.

In an embodiment, the quality determination system 101 may be communicatively coupled to a content database 113, through a client-server communication interface for obtaining a predefined template for each type of the input document 102 along with criticality information related to the predefined template for each type of the input document 102.

As illustrated in FIG. 1, the quality determination system 101 may receive the input document 102 from a user associated with the user device 103 for determining the quality. The input document 102 may be of different types. Thus, the quality determination system 101 may identify a type, and at least one sub-type of the input document 102. For instance, the type of the input document 102 may include, but not limited to, legal documents, Standard Operating Procedures (SOP), regulatory guideline documents, policy documents, offer letters, and manuals. A person skilled in the art would understand that the input document 102 may also include any other type not mentioned herein explicitly. Further, the format of the input document 102 may be word document, image, Portable Document Format (PDF), and the like. The sub-type of the input document 102 may depend on the type of the input document 102. For instance, for a contract, the sub-types may be unilateral Non-Disclosure Agreement (NDA), services Statement of Work (SOW), and the like. The type, and at least one sub-type of the input document 102 may be identified using a Natural Language Processing (NLP) technique and a trained neural network model. The neural network model may be trained using training documents of different types. Particularly, identifying the type, and the at least one sub-type of the input document 102 includes converting the input document 102 to a predefined format using one or more predefined techniques. The one or more predefined techniques may include, but not limited to, text realignment, Optical Character Recognition (OCR), and the like. For instance, if the input document 102 is in PDF format, it may be split into series of images and text may be extracted using the OCR technique. Also, one or more redlined content is removed from the input document 102 using configured rules and code.

Further, the input document 102 is processed by removing one or more errors from content of the input document 102 using the NLP technique. Typically, the input document 102 may be multi-lingual, and can be of different encoding formats. In addition, the one or more errors such as, character level, word level or phrase level errors may be introduced in the content of the input document 102 during OCR conversion. Therefore, the input document 102 is processed by normalization. Particularly, the input document 102 is processed by normalizing and fixing character as well as word level errors using the NLP technique. Once the type or at least one sub type of the input document 102 is identified, a criticality associated with the input document 102 is determined. For instance, if the type of the input document 102 is a legal document, for example a Statement of Work (SoW) document, the criticality may be of high when compared to any other document like Non-Disclosure-Agreement (NDA).

Further, the quality determination system 101 may detect layout of the content present in the input document 102 based on each of a plurality of segments extracted from the content and structural parameters associated with respective segments. The structural parameters may include, but not limited to, details on indentation, font type, line gap, text indentation, and the like. The layout of content is detected using a layout detection model trained using plurality of training segments.

The layout detection model may provide content which may belong to specific header including paragraphs, tables, diagrams, and the like. Then, the quality determination system 101 may embed the content from the layout of the content to a vector space using pretrained embedding models in order to understand the content. Further, based on the type and the at least one sub-type of the input document 102, the quality determination system 101 may identify a document review model from a plurality of document review models. Each of the plurality of document review models are trained for the type of document. For instance, a first document review model may be trained for a contract document, a second document review model may be trained for product specification documents, a third document review model may be trained for SOP document, and the like. Each of the plurality of document review models may be trained and stored in the quality determination system 101. Then, the document review model identified for the input document 102 is deployed for content compliance by fetching associated metadata prestored in the quality determination system 101 or from the content database 113. In an embodiment, the metadata associated with the document review model may be modified to keep a track of information about deployment. The plurality of document review models may be either machine learning models such as, Deep Learning (DL) models trained for the type of document or rule-based models. The rule-based models may perform based on predefined requirements and patterns in the input document 102. The rule-based models may improve performance of DL models and perform modifications based on the predefined requirements. As an example, consider an output from a document review model which is a DL model is inferred to analyze Term Length (TL) of the contract; while a rule-based model may view raw data given by the DL model in number of years and configured format for TL in months. In such case, the rule-based model may change the format from years to months. Similarly, rule-based model may change the outcome of the DL by applying business logic. As an example, the DL model may extract a precise phrase of the content and the rule-based model may execute on the precise phrase.

Further, the quality determination system 101 may maintain training information and deployment information for at least one of, a newly added document review model and previously trained plurality of document review models. The training information may include, but not limited to, trained model parameters, performance matrix, list of segments used in training, versions, and the like. The deployment information may include, but not limited to, hierarchical directory structure for each type of the input document 102, metadata associated with each document review model and trained, current, previous, and base version of each of the document review models.

Thereafter, the quality determination system 101 may determine the quality of the input document 102 along with a compliance score by identifying one or more deviations of the content of the input document 102 from content of a predefined template for the input document 102 based on the document review model. The one or more deviations indicate at least one of, additional content and missing content which are highlighted and displayed to the user along with respective identifier. For instance, deviation such as, additional, or missing text is shown differently. Additional words or sentences may be shown as strike through text and missing words/content may be shown with different font color when compared to the predefined template associated with the input document 102.

The compliance score for the input document 102 may be determined based on a weighted average of compliance scores related to each of the one or more deviations in the content of the input document 102 along with respective criticality information. The predefined template is obtained from the content database 113 which stores the predefined template for each type of the input document 102. Particularly, the quality determination system 101 may use the NLP techniques such as, tokenization, data cleaning and normalization for calculating the deviation between specific content such as, a clause in the input document 102 with respective content from the predefined template.

Further, the quality determination system 101 may update one or more model templates and the plurality of document review models based on feedback provided by a Subject Matter Expert (SME), and previously used training data. The feedback is stored in the library of clauses and key terms. In an embodiment, the feedback may be provided on at least one segment of the plurality of segments. The quality determination system 101 may retrain the one or more model templates and the plurality of document review models for at least one segment using at least one or more deep learning models and predefined rules. Particularly, the one or more model templates and the plurality of document review models may be retrained using newly created data in an incremental way i.e., by using previously used data and newly created data. Upon retraining the models, the quality determination system 101 may validate performance of the retrained plurality of document review models. The validation is performed on hold out dataset which is randomly segregated from overall dataset or dataset modified by SME feedback. The validation is performed by comparing the performance of each of the plurality of document review models on overall data set and hold out dataset before re-training and after re-training to determine the performance of newly added document review model.

Figure 2:
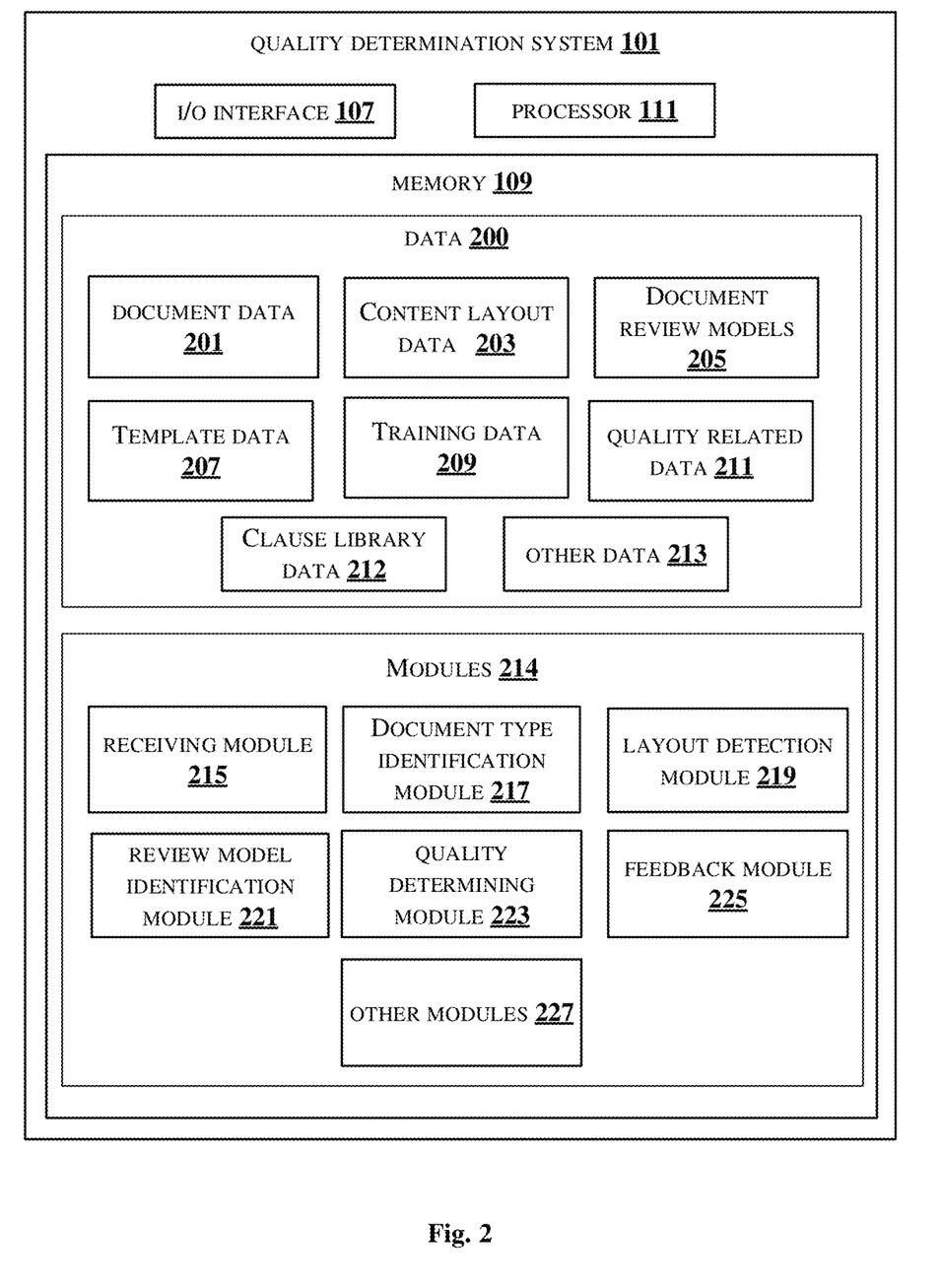
FIG. 2 shows a detailed block diagram of a quality determination system in accordance with some embodiments of the present disclosure.

FIG. 2 shows a detailed block diagram of a quality determination system in accordance with some embodiments of the present disclosure.

As shown, the quality determination system 101 may include the I/O interface 107, the memory 109, the processor 111, and modules 214. The memory 109 includes data 200. The I/O interface 107 may be configured to receive the input document 102 from the user associated with the user device 103 for quality determination during risk and compliance assessment of the input document 102, receive feedback from the SME, receive predefined template from the content database 113. Further, the I/O interface 107 may provide information regarding the quality, risk, and deviations such as, additional content and missing content, of the input document 102 to the user device 103 along with respective identifier.

The processor 111 may be configured to receive the input document 102, the feedback from the SME, the predefined template from the content database 113 through the I/O interface 107. Further, the processor 111 may retrieve data from the memory 109 and interact with the modules 214 and the content database 113 to perform quality assessment for the input document 102. The memory 109 may store the data 200 received through the I/O interface 107, the modules 214 and the processor 111. In one embodiment, the data 200 may also include document data 201, content layout data 203, document review models 205, template data 207, training data 209, quality related data 211, clause library data 212, and other data 213.

The document data 201 may include details about the input document 102 received for quality assessment. The details may include the type, and at least one sub-type of the input document 102. Further, the details may include criticality associated with the input document 102.

The content layout data 203 may include details about the layout of content in the input document 102. For instance, the details may include table of content, redline content in the input document 102, the plurality of segments extracted from the content of the input document 102 and the structural parameters associated with each of the extracted segments.

The document review models 205 may include the plurality of document review models for each type of the input document 102 along with respective information. The information may include, but not limited to, metadata details for respective document review model, the training information, and the deployment information. The training information may include, but not limited to, trained model parameters, performance matrix, list of segments used in training, versions, and the like. The deployment information may include, but not limited to, hierarchical directory structure for each type of the input documents, metadata associated with each document review model and trained, current, previous, and base version of each of the document review models 205.

The template data 207 may include the predefined template associated with the input document 102. For instance, the predefined template may include standard clauses used in different types of contract documents, and the like.

The training data 209 may include the training dataset such as, training input documents for training the neural network model, SME feedback received in library of clauses and key terms, the layout detection model, and the plurality of document review models 205. The training data 209 may also include predefined rules for retraining the one or more model templates and the plurality of document review models 205.

The quality related data 211 may include details about the quality determined for the input document 102. Particularly, the details may include applicable compliance scores for plurality of document types and segments, and details of one or more deviations in the content of the input document 102 from content of the predefined template for the input document 102.

The clause library data 212 may include predefined clauses and key terms defined for each type of the document. Further, the clause library data 212 may include the SME feedback.

The other data 213 may store data, including temporary data and temporary files, generated by the modules 214 for performing the various functions of the quality determination system 101.

In some embodiments, the data 200 stored in the memory 109 may be processed by the modules 214 of the quality determination system 101. In an example, the modules 214 may be communicatively coupled to the processor 111 configured in the quality determination system 101. The modules 214 may be present outside the memory 109 as shown in FIG. 2 and implemented as hardware. As used herein, the term modules may refer to an Application Specific Integrated Circuit (ASIC), an electronic circuit, a processor (shared, dedicated, or group) and a memory that execute one or more software or firmware programs, a combinational logic circuit, and/or other suitable components that provide the described functionality.

In some embodiments, the modules 214 may include, for example, a receiving module 215, a document type identification module 217, a layout detection module 219, a review model identification module 221, a quality determining module 223, a feedback module 225, and other modules 227.

The other modules 227 may be used to perform various miscellaneous functionalities of the quality determination system 101. The other modules 227 may include an updating module, a training module, and a validation module. The updating module may update the one or more model templates and the plurality of document review models based on the feedback provided by the Subject Matter Expert (SME) for the quality of the input document 102 and previously used training data. The training module may train the plurality of models such as, the neural network model using training input documents of different types. The training module may train the layout detection model using the plurality of training segments from different types of input documents.

Figure 3A:
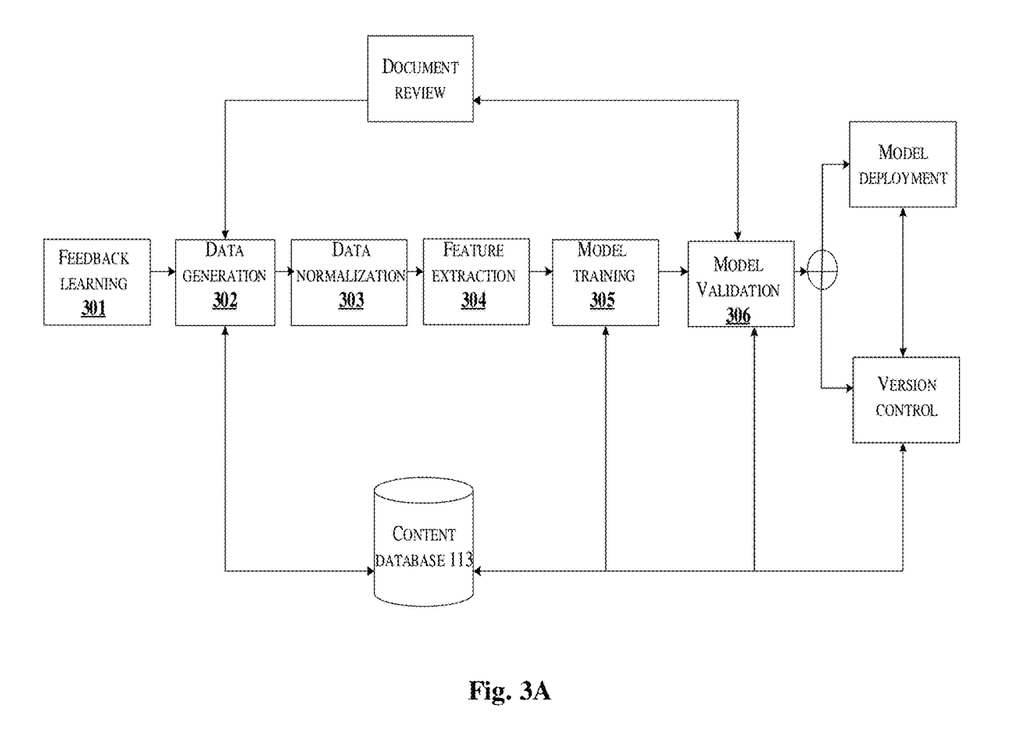
FIG. 3A shows an exemplary flowchart for model training and validation in accordance with some embodiments of the present disclosure.

FIG. 3A shows an exemplary flowchart for model training and validation in accordance with some embodiments of the present disclosure. As shown, at step 301, the training module provides feedback learning in order to retrain the models with newly created data in an incremental way i.e., by using previously used data and newly created data for training the models. At step 302, data generation is provided, wherein while reviewing the input document 102, an analyst can highlight correct data for which an incorrect value is provided. This information may be stored in the content database 113 in form of key-value pair, where the key may be a label and the value are a highlight performed by the analyst. So, the information in the content database 113 may be recorded for each entity and clause present in the input document 102 on crossing a predefined threshold for each entity and clause. In this process, the input documents for which the feedback is recorded from user may be regenerated in a format used for training with respective key-value pair present in tagged format. At step 303, the regenerated data from previous step is normalized to remove redundancy and incorrect data. In an embodiment, data balancing may also be performed for all tagged information. Then, vocabulary of content of the input document 102 may be updated by finding unique words from labelled data. Further, previous data used for training may be combined with newly regenerated data, and split into train, dev, and test sets. At step 304, the three sets created above are used for feature extraction. At this step, the normalized labelled data may be converted to the vector space.

At step 305, different DL models in the field of NLP may be used for training the model using the new data. When the SME starts training, training may be invoked for the document review model for which the SME initiated the training. At step 306, features for validating performance of the newly trained model are provided. Particularly, entity wise details may be provided s at one place. The SME may validate the performance of the newly trained models by randomly sending data for entities. Upon validation, it may either be decided to deploy or discard the trained models. The validation module may validate the performance of the retrained plurality of document review models. The validation may be performed on hold out dataset which is randomly segregated from overall dataset or dataset modified by SME feedback. The validation is performed by comparing performance of each of the plurality of document review models on overall data set and hold out dataset before re-training and after re-training to determine the performance of new document review model by the SME. It will be appreciated that aforementioned modules 214 may be represented as a single module or a combination of different modules. Furthermore, a person of ordinary skill in the art will appreciate that in an implementation, the one or more modules 214 may be stored in the memory 109, without limiting the scope of the disclosure. The said modules 214 when configured with the functionality defined in the present disclosure will result in a novel hardware.

In an embodiment, the receiving module 215 may receive the input document 102 from the user device 103 through the I/O interface 107. The input document 102 may be received for quality determination during compliance and risk assessment. The receiving module 215 may further receive the feedback from the SME regarding the quality of the input document 102, and the predefined template from the content database 113.

The document type identification module 217 may identify the type and at least one sub type of the input document 102. For instance, the type of the input document 102 may include, but not limited to, legal documents, Standard Operating Procedures (SOP), regulatory guideline documents, policy documents, offer letters, and manuals. Further, the input document 102 may be in different format such as, word, image, PDF, and the like. The sub-type of the input document 102 may depend on the type of document. For instance, for a contract, the sub-types may be unilateral Non-Disclosure Agreement (NDA), services Statement of Work (SOW), or the like. The document type identification module 217 may identify the type, and at least one sub-type of the input document 102 using the NLP technique and the neural network model. Particularly, the document type identification module 217 may identify the type, and the at least one sub-type of the input document 102 by converting the input document 102 to the predefined format using one or more predefined techniques. The one or more predefined techniques may include, but not limited to, text realignment, Optical Character Recognition (OCR), and the like. Then, the document type identification module 217 may remove redlined content from the input document 102 using a rule-based technique. For instance, when a word document is reviewed and is present in redlined format, one or more redlined words may be removed. Further, the document type identification module 217 may process the input document 102 by removing one or more errors in the content of the input document 102 by using the NLP technique. In an embodiment, the input document 102 may be processed by normalization. Particularly, the document type identification module 217 may process the input document 102 by normalizing and fixing character and word level errors using the NLP technique. In addition, once the type or at least one sub type of the input document 102 is identified, the document type identification module 217 may determine the criticality associated with the input document 102. For instance, if the type of the input document 102 is a legal document, the criticality may be high when compared to any other document.

The layout detection module 219 may detect the layout of the content present in the input document 102 based on each of the plurality of segments extracted from the content and structural parameters associated with respective segments. The layout detection module 219 may detect the layout of the content by using the layout detection model trained using plurality of training segments. The structural parameters may include, but not limited to, details on indentation, font type, line gap, text indentation, and the like. Further, the layout detection module 219 may embed the content from the layout of the content to the vector space using the pretrained embedding models in order to understand the content.

The review model identification module 221 may identify the document review model from the plurality of document review models based on the type and the at least one sub-type of the input document 102. The review model identification module 221 may deploy the document review model for the input document 102 for content compliance by fetching associated metadata prestored in the quality determination system 101 or from the content database 113. In an embodiment, the metadata associated with the document review model may be modified to keep a track of information about the deployed model. The plurality of document review models may be either deep learning (DL) models trained on the specific data for a document type, or rule-based models. The rule-based models may perform based on predefined requirements and patterns in the input document 102.

Figure 3B:
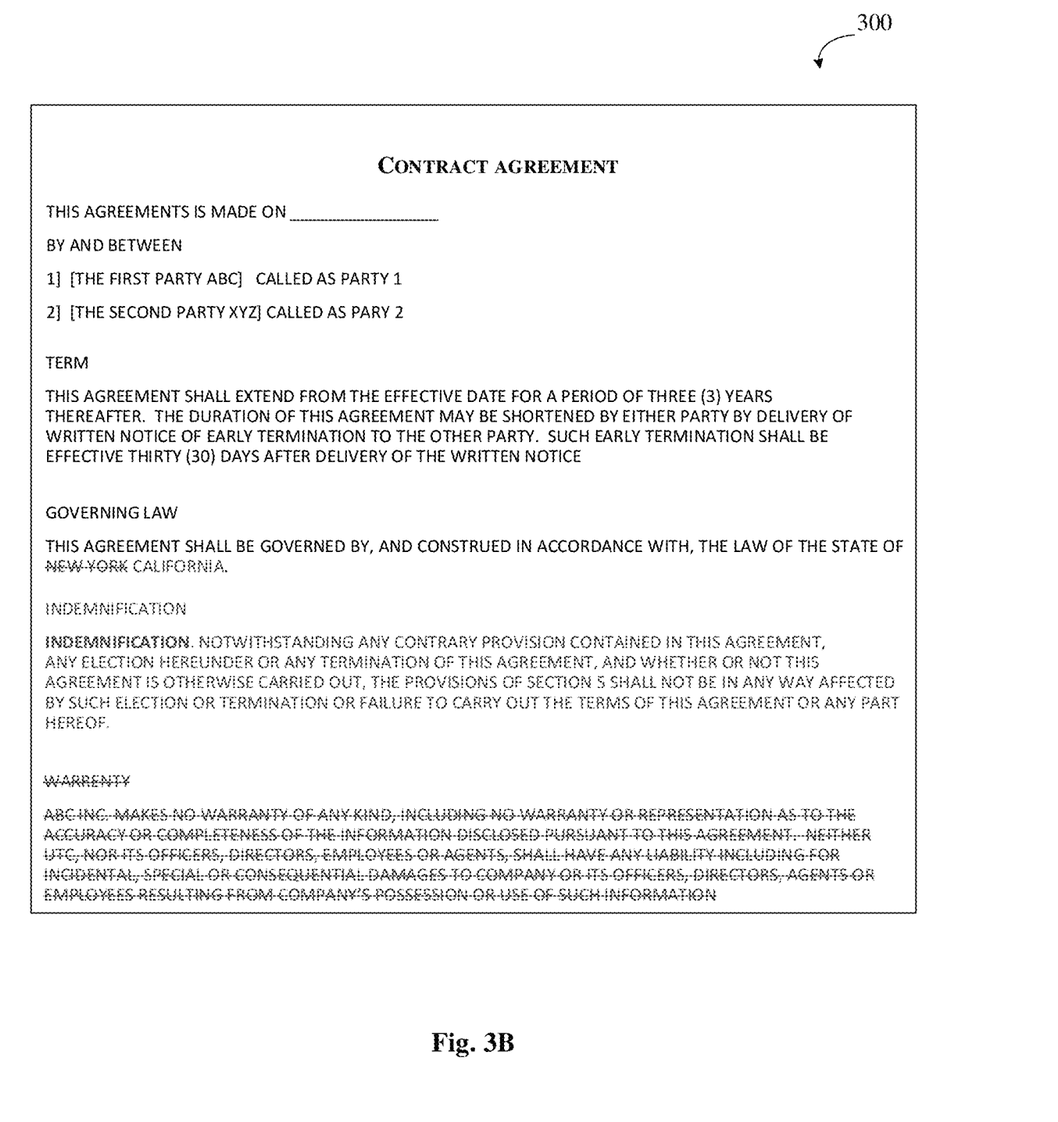
FIG. 3B shows an exemplary representation of a document in accordance with some embodiments of the present disclosure.

The quality determining module 223 may determine the quality of the input document 102 along with the compliance score by identifying the one or more deviations of the content of the input document 102. The one or more deviations may be identified from the content of the predefined template for the input document 102 based on the document review model. The quality determining module 223 may obtain the predefined template from the content database 113 which stores the predefined template for each type of the input document 102. Particularly, the quality determining module 223 may use techniques such as, tokenization, data cleaning and normalization for calculating deviation between specific content such as, the clause in the input document 102 with respective content from the predefined template. The compliance score for the input document 102 may be determined based on the weighted averages of individual compliance scores related to each of the one or more deviations in the content of the input document 102 along with respective criticality information. The one or more deviations indicate at least one of, the additional content and the missing content which is highlighted and displayed to the user along with respective identifier. For instance, the one or more deviations such as, additional, or missing text is shown differently. Additional words or sentences may be shown as strike through text and missing words/content may be shown in different color as compared to predefined template associated with the input document 102. FIG. 3B show an exemplary representation of a document in accordance with some embodiments of the present disclosure. As shown, FIG. 3B shows an input document 102 which is of type contract agreement 300. The contract agreement 300 is provided as the input document 102 for determining the quality associated with the written contract agreement 300. As shown, user modified content such as, the country detail under governing law is identified to be deviating from the predefined template and is shown with blue color. Missing content such as indemnification clause added by the user is also displayed with different font color. Further, redlined content as indicated under warranty is identified for removing from the contract agreement 300.

The feedback module 225 may be configured to receive feedback provided by the Subject Matter Expert (SME) for the quality of the input document. In an embodiment, the feedback may be provided on at least one segment of the plurality of segments. Particularly, a user interface may be provided for the users to provide the feedback on the results which the Subject Matter Expert (SME) may use to further train the models. This may facilitate in re-training and deployment of incremental models such that the models are not outdated.

Figure 4:
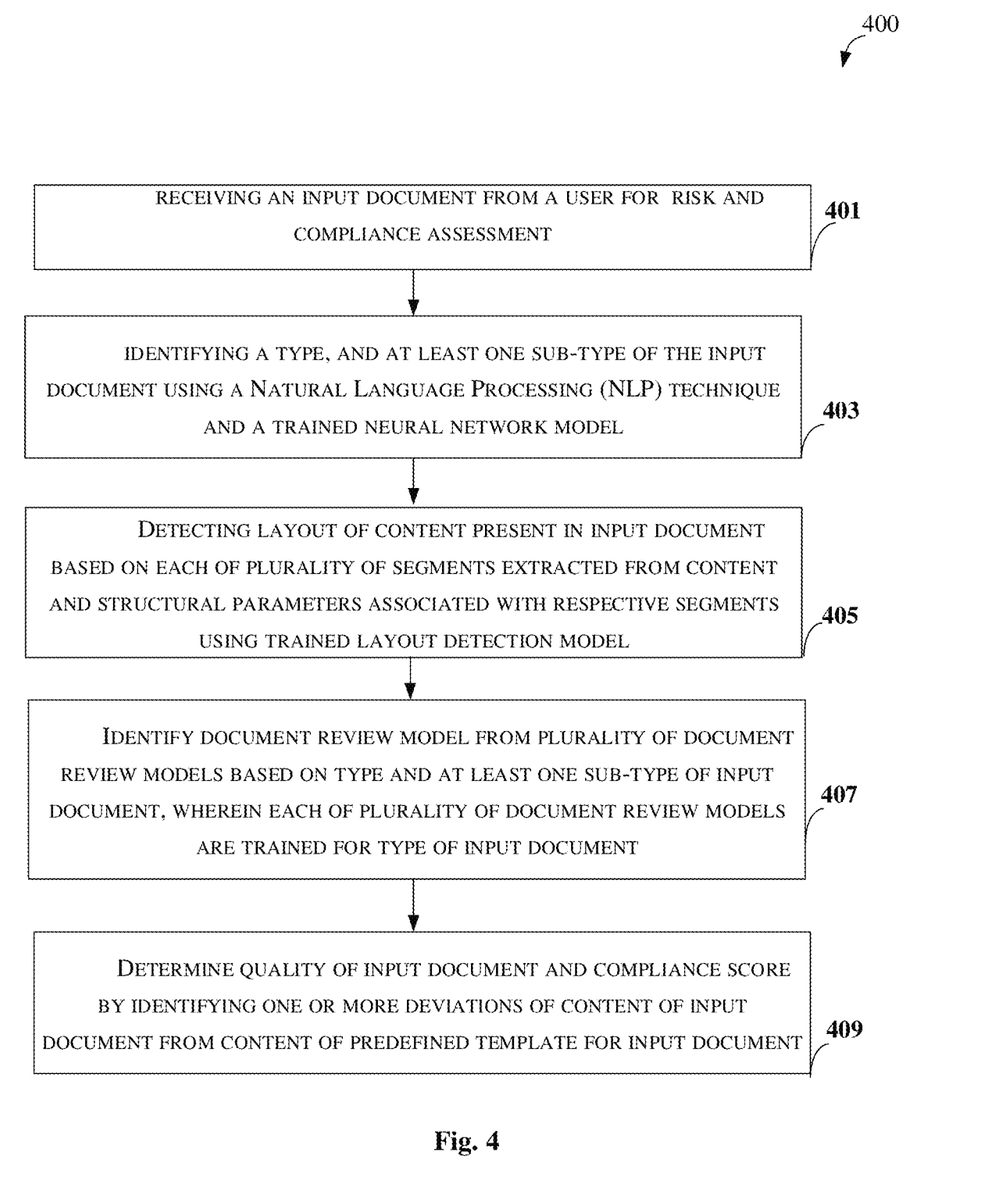
FIG. 4 shows a flow chart illustrating a method of determining quality of a document during risk and compliance assessment in accordance with some embodiments of the present disclosure.

FIG. 4 shows a flow chart illustrating a method of determining quality risk of a document during compliance assessment in accordance with some embodiments of the present disclosure.

As illustrated in FIG. 4, the method 400 includes one or more blocks illustrating a method of determining quality of a document during risk and compliance assessment. The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, the method may include receiving, by the receiving module 215, the input document 102 from the user associated with the user device 103 for determining the quality during risk and compliance assessment.

At block 403, the method may include identifying, by the document type identification module 217, the type, and at least one sub-type of the input document 102 using the NLP technique and the trained neural network model. The type of the input document 102 may include, but not limited to, legal documents, Standard Operating Procedures (SOP), regulatory guideline documents, policy documents, offer letters, and manuals. Particularly, the type, and the at least one sub-type of the input document 102 is identified by converting the input document 102 to the predefined format using the one or more predefined techniques and removing the one or more redlined content from the input document 102 using the rule-based technique. Then, the input document 102 is processed by removing the one or more errors in the content of the input document 102 using the NLP technique. Further, the criticality associated with the input document 102 is determined based on the type of the input document 102.

At block 405, the method may include detecting, by the layout detection module 219, the layout of the content present in the input document 102 based on each of the plurality of segments extracted from the content and structural parameters associated with respective segments using the trained layout detection model. Further, the content from the layout of the content is embedded to the vector space using the pretrained embedding models.

At block 407, the method may include identifying, by the review model identification module 221, the document review model from the plurality of document review models based on the type and the at least one sub-type of the input document 102. Each of the plurality of document review models are trained for a particular type of input document 102. Further, the one or more model templates and the plurality of document review models may be updated based on the feedback provided by the SME and the previously used training data. In an embodiment, the feedback is provided on at least one segment of the plurality of segments. Then, the one or more model templates and the plurality of document review models may be retained for at least one segment using at least one or more deep learning models and predefined rules. Particularly, the one or more model templates and the plurality of document review models may be retained using newly created data in an incremental way i.e., by using previously used data and newly created data. Upon retraining the plurality of document review models, the performance of the retrained plurality of document review models may be validated. The validation may be performed on hold out dataset which is randomly segregated from overall dataset or dataset modified by SME feedback. The validation is performed by comparing performance of each of the plurality of document review models on overall data set and hold out dataset before re-training and after re-training to determine the performance of new document review model by the SME.

At block 409, the method may include determining, by the quality determining module 223, the quality of the input document 102 along with the compliance score by identifying the one or more deviations of the content of the input document 102 from content of the predefined template for the input document 102 based on the document review model. In an embodiment, the one or more deviations may indicate at least one of, the additional content and the missing content which is highlighted and displayed to the user along with respective identifier. The compliance score for the input document 102 may include the weighted average of individual compliance scores related to each of the one or more deviations in the content of the input document 102 along with respective criticality information. In an embodiment, the predefined template may be obtained from the content database 113.

Figure 5:
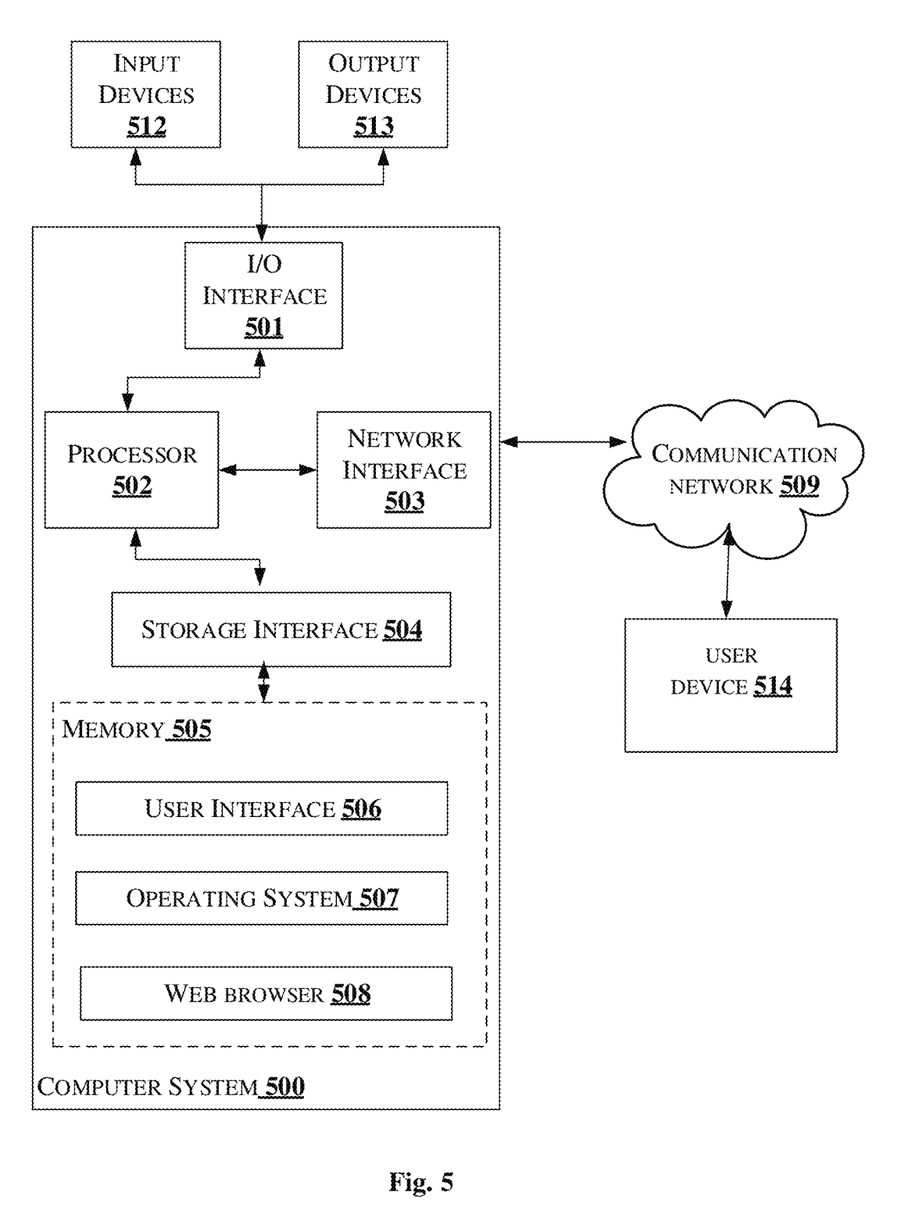
FIG. 5 shows a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be a system for determining a quality of a document during risk and compliance assessment. The computer system 500 may include a central processing unit ("CPU" or "processor") 502. The processor 502 may comprise at least one data processor for executing program components for executing user or system-generated business processes. The processor 502 may include specialized processing units such as integrated system (bus) controllers, memory management control units, floating point units, graphics processing units, digital signal processing units, etc.

The processor 502 may be disposed in communication with one or more input/output (I/O) devices (512 and 513) via I/O interface 501. The I/O interface 501 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802. n /b/g/n/x, Bluetooth, cellular (e.g., Code-Division Multiple Access (CDMA), High-Speed Packet Access (HSPA+), Global System for Mobile Communications (GSM), Long-Term Evolution (LTE) or the like), etc. Using the I/O interface 501, the computer system 500 may communicate with one or more I/O devices 512 and 513.

In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. The communication network 509 may be used to receive the input document 102 from a user device 514.

The communication network 509 can be implemented as one of the several types of networks, such as intranet or Local Area Network (LAN) and such within the organization. The communication network 509 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc.

In some embodiments, the processor 502 may be disposed in communication with a memory 505 (e.g., RAM, ROM, etc. as shown in FIG. 5 via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user/application 506, an operating system 507, a web browser 508, a mail client, a mail server a web server, and the like. In some embodiments, computer system 500 may store user/application data, such as the data, variables, records, etc. as described in this invention. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACK-BERRY® OS, or the like. A user interface may facilitate display, execution, interaction, manipulation, or operation of program components through textual or graphical facilities. For example, user interfaces may provide computer interaction interface elements on a display system operatively connected to the computer system 500, such as cursors, icons, check boxes, menus, windows, widgets, etc. Graphical User Interfaces (GUIs) may be employed, including, without limitation, APPLE MACINTOSH® operating systems, IBM™ OS/2, MICROSOFT™ WINDOWS™ (XP™, VISTA™/7/8, 10 etc.), Unix® X-Windows, web interface libraries (e.g., AJAX™, DHTML™, ADOBE® FLASH™ JAVASCRIPT™, JAVA™, etc.), or the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

In an embodiment, the present disclosure facilitates automated compliance monitoring which leverages quick processing of time critical documents.

An embodiment of the present disclosure provides better and efficient standardization of document authoring process.

An embodiment of the present disclosure provides better compliance to internal and external audits.

An embodiment of the present disclosure facilitates enriching any input documents for an organization.

An embodiment of the present disclosure maintains critical details across volumes of data during document review.

An embodiment of the present disclosure facilitates quality and compliance checks of document with minimum human interventions.

In an embodiment, the disclosed method and system may overcome technical problem of inefficient and manual methods of compliance monitoring for identifying risks associated with an input document, especially when the input document does not follow any standardized format. The present disclosure determines quality for any type of input document during risk and compliance assessment by implementing Natural Language Processing (NLP) and Artificial Intelligence (AI) technique. The NLP and AI technique is used to leverage information in the input document and extract a plurality of segments from content of the input document. Particularly, the present disclosure may determine layout of the content of the input document based on the plurality of segments by parsing entire document at modular level. Further, a document review model is identified in order to determine quality associated with the document based on deviation analysis. Further, the present disclosure provides feedback learning in order to retrain the review model based on Subject Matter Expert (SME) feedback. Therefore, the present disclosure facilitates automated compliance monitoring which leverages quick processing of time critical documents. Further, the present disclosure provides better and efficient standardization of document authoring process and provides better compliance to internal and external audits.

Currently there are no efficient means to identify appropriate document template for compliance monitoring based on context of the document. The existing systems fail to monitor and identify risks associated with the document if the input document does not follow any standardized format.

In light of the above-mentioned advantages and the technical advancements provided by the disclosed system and method, the claimed steps as discussed above are not routine, conventional, or well understood in the art, as the claimed steps enable the following solutions to the existing problems in conventional technologies. Further, the claimed steps clearly bring an improvement in the functioning of the system itself as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise. The enumerated listing of items does not imply that any or all the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Quality determination system |
| 102 | Input document |
| 103 | User device |
| 105 | Communication network |
| 107 | I/O interface |
| 109 | Memory |
| 111 | Processor |
| 113 | Content database |
| 200 | Data |
| 201 | Document data |
| 203 | Content Layout data |
| 205 | Document review models |
| 207 | Template data |
| 209 | Training data |
| 211 | Quality related data |
| 212 | Clause library data |
| 213 | Other data |
| 214 | Modules |
| 215 | Receiving module |
| 217 | Document type identification module |
| 219 | Layout detection module |
| 221 | Review model identification module |
| 223 | Quality determining module |
| 225 | Feedback module |
| 227 | Other modules |
| 300 | Contract agreement |
| 500 | System |
| 501 | I/O Interface |
| 502 | Processor |
| 503 | Network interface |
| 504 | Storage interface |
| 505 | Memory |
| 506 | User/Application |
| 507 | Operating system |
| 508 | Web browser |
| 509 | Communication network |
| 512 | Input device |
| 513 | Output device |
| 514 | User device |

What is claimed is:

1. A method of determining quality of a document during risk and compliance assessment, the method comprising:
    receiving, by a quality determination system, an input document from a user for risk and compliance assessment;
    identifying, by the quality determination system, a type, and at least one sub-type of the input document using a Natural Language Processing (NLP) technique and a trained neural network model;
    detecting, by the quality determination system, layout of content present in the input document based on each of a plurality of segments extracted from the content and structural parameters associated with respective segments using a trained layout detection model;
    identifying, by the quality determination system, a document review model from a plurality of document review models based on the type and the at least one sub-type of the input document, wherein each of the plurality of document review models are trained for the type of the input document; and
    determining, by the quality determination system, the quality of the input document and a compliance score by identifying one or more deviations of the content of the input document from content of a predefined template for the input document based on the document review model.

2. The method as claimed in claim 1, wherein the type of the input document comprises legal documents, Standard Operating Procedures (SOP), regulatory guideline documents, policy documents, offer letters, and manuals.

3. The method as claimed in claim 1, wherein identifying the type, and the at least one sub-type of the input document comprises:
    determining a criticality associated with the input document based on the type of the input document;
    converting the input document to a predefined format using one or more predefined techniques;
    removing one or more redlined content from the input document using rule-based technique; and
    processing the input document by removing one or more errors in the content of the input document using the NLP technique.

4. The method as claimed in claim 1, wherein the one or more deviations indicate at least one of additional content and missing content which is highlighted and displayed to the user along with respective identifier.

5. The method as claimed in claim 1, wherein the compliance score for the input document comprises weighted average of individual compliance scores related to each of the one or more deviations in the content of the input document along with respective criticality information.

6. The method as claimed in claim 1 and further comprising:
    maintaining training information and deployment information for at least one of new document review model and previously trained plurality of document review models in the quality determination system, wherein the training information comprises trained model parameters, performance matrix, list of segments used in training, versions, and the deployment information comprises hierarchical directory structure for each type of the input document metadata associated with each document review model, trained, current, previous, and base version of each of the document review models.

7. The method as claimed in claim 1 and further comprising:
    updating one or more model templates and the plurality of document review models based on feedback provided by a Subject Matter Expert (SME) for the quality of the input document and previously used training data, wherein the feedback is provided on at least one segment of the plurality of segments;
    retraining the one or more model templates and the plurality of document review models for at least one segment using at least one or more deep learning models and predefined rules; and
    validating performance of the retrained plurality of document review models.

8. The method as claimed in claim 1 and further comprising:
    embedding the content from the layout of the content to a vector space using pretrained embedding models.

9. The method as claimed in claim 1, wherein the predefined template is obtained from a content database associated with the quality determination system.

10. The method as claimed in claim 9, wherein the content database comprises the predefined template for each type of the input document and criticality information related to the predefined template for each type of the input document.

11. A quality determination system for determining quality of a document during risk and compliance assessment, comprising:
    a processor; and
    a memory communicatively coupled to the processor, wherein the memory stores processor instructions, which, on execution, causes the processor to:
        receive an input document from a user for risk and compliance assessment;
        identify a type, and at least one sub-type of the input document using a Natural Language Processing (NLP) technique and a trained neural network model;
        detect layout of content present in the input document based on each of a plurality of segments extracted from the content and structural parameters associated with respective segments using a trained layout detection model;
        identify a document review model from a plurality of document review models based on the type and the at least one sub-type of the input document, wherein each of the plurality of document review models are trained for the type of input document; and
        determine the quality of the input document and a compliance score by identifying one or more deviations of the content of the input document from content of a predefined template for the input document based on the document review model.

12. The quality determination system as claimed in claim 11, wherein the type of the input document comprises legal documents, Standard Operating Procedures (SOP), regulatory guideline documents, policy documents, offer letters, and manuals.

13. The quality determination system as claimed in claim 11, wherein the processor identifies the type, and the at least one sub-type of the input document by:
    determining a criticality associated with the input document based on the type of the input document;
    converting the input document to a predefined format using one or more predefined techniques;
    removing redlined content from the input document using rule-based technique; and processing the input document by removing one or more errors in the content of the input document using the NLP technique.

14. The quality determination system as claimed in claim 11, wherein the one or more deviations indicate at least one of additional content and missing content which is highlighted and displayed to the user along with respective identifier.

15. The quality determination system as claimed in claim 11, wherein the compliance score for the input document comprises weighted average of individual compliance scores related to each of the one or more deviations in the content of the input document along with respective criticality information.

16. The quality determination system as claimed in claim 11, wherein the processor is configured to:
   maintain training information and deployment information for at least one of new document review model and previously trained plurality of document review models, wherein the training information comprises trained model parameters, performance matrix, list of segments used in training, versions, and the deployment information comprises hierarchical directory structure for each type of the input document metadata associated with each document review model, trained, current, previous, and base version of each of the document review models.

17. The quality determination system as claimed in claim 11, wherein the processor is configured to:
   update one or more model templates and the plurality of document review models based on feedback provided by a Subject Matter Expert (SME) for the quality of the input document and previously used training data, and wherein the feedback is provided on at least one segment of the plurality of segments;
   retrain the one or more model templates and the plurality of document review models for at least one segment using at least one or more deep learning models and predefined rules; and
   validate performance of the retrained plurality of document review models.

18. The quality determination system as claimed in claim 11, wherein the processor embeds the content from the layout of the content to a vector space using pretrained embedding models.

19. The quality determination system as claimed in claim 11, wherein the processor obtains the predefined template from a content database associated with the quality determination system, and wherein the content database comprises the predefined template for each type of the input document and criticality information related to the predefined template for each type of the input document.

20. A non-transitory computer readable medium including instruction stored thereon that when processed by at least one processor cause a quality determination system to perform operation comprising:
   receiving an input document from a user for risk and compliance assessment;
   identifying a type, and at least one sub-type of the input document using a Natural Language Processing (NLP) technique and a trained neural network model;
   detecting layout of content present in the input document based on each of a plurality of segments extracted from the content and structural parameters associated with respective segments using a trained layout detection model;
   identifying a document review model from a plurality of document review models based on the type and the at least one sub-type of the input document, wherein each of the plurality of document review models are trained for the type of the input document; and
   determining the quality of the input document and a compliance score by identifying one or more deviations of the content of the input document from content of a predefined template for the input document based on the document review model.

* * * * *